United States Patent
Yamada et al.

(10) Patent No.: US 6,470,439 B2
(45) Date of Patent: Oct. 22, 2002

(54) FIFO MEMORY CONTROL CIRCUIT

(75) Inventors: Takashi Yamada, Tenri (JP); Koji Horikawa, Nara (JP)

(73) Assignee: Sharp Kabushiki Kaisha (JP)

( * ) Notice: Subject to any disclaimer, the term of this patent is extended or adjusted under 35 U.S.C. 154(b) by 0 days.

(21) Appl. No.: 09/802,694

(22) Filed: Mar. 8, 2001

(65) Prior Publication Data
US 2002/0023238 A1 Feb. 21, 2002

(30) Foreign Application Priority Data
Apr. 20, 2000 (JP) ........................................ 2000-120041

(51) Int. Cl.$^7$ .............................................. G06F 12/00
(52) U.S. Cl. ........................ 711/215; 711/109; 711/110
(58) Field of Search ................. 711/109, 110, 711/215

(56) References Cited

U.S. PATENT DOCUMENTS

| | | | | |
|---|---|---|---|---|
| 4,375,676 A | * | 3/1983 | Berkowitz | 711/109 |
| 4,494,190 A | * | 1/1985 | Peters | 710/310 |
| 4,894,797 A | * | 1/1990 | Walp | 711/109 |
| 4,942,593 A | * | 7/1990 | Whiteside et al. | 327/100 |
| 5,379,399 A | * | 1/1995 | Conway-Jones et al. | 326/105 |
| 5,388,238 A | * | 2/1995 | McHarg et al. | 365/221 |
| 5,546,347 A | * | 8/1996 | Ko et al. | 365/189.01 |
| 5,663,910 A | * | 9/1997 | Ko et al. | 365/189.04 |
| 5,761,203 A | * | 6/1998 | Morales | 370/418 |
| 6,412,052 B2 | * | 6/2002 | Keeth et al. | 711/105 |

FOREIGN PATENT DOCUMENTS

JP      11-175310      7/1999

* cited by examiner

*Primary Examiner*—Reba I. Elmore
(74) *Attorney, Agent, or Firm*—Morrison & Foerster LLP

(57) ABSTRACT

The present invention relates to a FIFO (First In First Out) memory control circuit for controlling FIFO memory which is used in various electronic devices. Specifically, the present invention relates to a FIFO memory control circuit capable of performing asynchronous read/write control hen a write clock and a read clock are different and it is known or determined which of these clocks has a higher clock frequency.

9 Claims, 13 Drawing Sheets

(A) RCLK
(B) LSB of RADR (RADR0)
(C) Output of flip-flop 201
(D) Output of flip-flop 202
(E) Output of EX-OR203 (DNEN)
(F) RE
(G) WCLK (FASTCLK)
(H) WE (UPEN)
(I) Output of up-down counter (CNT)

(A) WCLK
(B) LSB of WADR (WADR0)
(C) Output of flip-flop 301
(D) Output of flip-flop 302
(E) Output of EX-OR303 (UPEN)
(F) WE
(G) RCLK (FASTCLK)
(H) RE
(I) Output of up-down counter (CNT)

Read clock signal (RCLK)

RE (=Count-down enable signal)

Write clock signal WCLK
(Count clock signal)

WE (=Count-up enable signal)

Output of up-down counter
(CNT)

Read clock siganl RCLK
(Count clock signal)

RE (=Count-down enable signal)

Write clock signal (WCLK)

WE (=Count-up enable signal)

Output of up-down counter
(CNT)

FIFO MEMORY CONTROL CIRCUIT

BACKGROUND OF THE INVENTION

1. Field of the Invention

The present invention relates to a FIFO (First In First Out) memory control circuit for controlling FIFO memory which is used in various electronic devices. Specifically, the present invention relates to a FIFO memory control circuit capable of performing asynchronous read/write control when a write clock and a read clock are different and it is known or determined which of these clocks has a higher clock frequency.

2. Description of the Related Art

FIG. 11 shows a structure of a conventional FIFO memory control circuit 1100. The FIFO memory control circuit 1100 includes a memory 101, a write control section 102, a read control section 103, a write address circuit 104, a read address circuit 105, and a Full-Empty control circuit 106.

The memory 101 is a dual-port RAM (Random Access Memory) in which reading and writing of data can be performed simultaneously, and which has a memory capacity of N words. In the memory 101, while a write permission signal (WE) is asserted, data (WDATA) is written in an address designated by a write address (WADR) on a word-by-word basis at a clock timing of a write clock signal (WCLK). On the other hand, while a read permission signal (RE) is asserted, data (RDATA) is read from an address designated by a read address (RADR) on a word-by-word basis at a clock timing of a read clock signal (RCLK). The write permission signal (WE) is output from the write control section 102 (described later), and the read permission signal (RE) is output from the read control section 103 (described later).

The write address circuit 104 receives the write clock signal (WCLK) and the write permission signal (WE). While the write permission signal (WE) is asserted, the write address circuit 104 increments the write address (WADR) by one at a clock timing of the write clock signal (WCLK).

The read address circuit 105 receives the read clock signal (RCLK) and the read permission signal (RE). While the read permission signal (RE) is asserted, the read address circuit 105 increments the read address (RADR) by one at a clock timing of the read clock signal (RCLK).

The Full-Empty control circuit 106 is formed by an up-down counter 107 and a signal generator 108. The Full-Empty control circuit 106 obtains the number of effective data, which is the difference between the number of data words written in the memory 101 and the number of data words read from the memory 101. That is, the "number of effective data words" means the number of data words in the memory 101 which have not yet read therefrom. Based on the number of effective data, the Full-Empty control circuit 106 generates control signals for writing and reading operations.

The up-down counter 107 receives the write permission signal (WE) as a count-up enable signal (UPEN) which permits a count-up operation and the read permission signal (RE) as a count-down enable signal (DNEN) which permits a count-down operation. While one of the count-up enable signal (UPEN) and the count-down enable signal (DNEN) is asserted, the up-down counter 107 performs a count operation at a clock timing of the write clock signal (WCLK). A count value (CNT) of the up-down counter 107 is equal to the number of effective data words, which is output to the signal generator 108.

The signal generator 108 receives the count value (CNT) from the up-down counter 107. When the received count value (CNT) is 0, the signal generator 108 outputs to the read control section 103 an empty signal (EMP) which indicates that the memory 101 has no data to be read. When the received count value (CNT) is N (the number of words storable in the memory 101), the signal generator 108 outputs to the write control section 102 a full signal (FLL) which indicates that the memory 101 has no more capacity to store data.

The write control section 102 receives the full signal (FLL). While the full signal (FLL) is asserted, the write control section 102 prohibits writing data in the memory 101, thereby preventing the memory 101 from losing data due to overwriting.

The read control section 103 receives the empty signal (EMP). While the empty signal (EMP) is asserted, the read control section 103 prohibits reading data from the memory 101, thereby preventing one data word from being read twice from the memory 101.

FIG. 12 shows a structure of a conventional FIFO memory control circuit 1200 in which an up-down counter 107' performs a count operation at a clock timing of a read clock signal (RCLK). In other respects, the FIFO memory control circuit 1200 has the same structure as the conventional FIFO memory control circuit 1100, and descriptions thereof are omitted.

In the conventional FIFO memory control circuit 1100, when the write clock signal (WCLK) and the read clock signal (RCLK) have the same frequency, the up-down counter 107 uses the write permission signal (WE) as a count-up enable signal (UPEN) which permits a count-up operation and the read permission signal (RE) as a count-down enable signal (DNEN) which permits a count-down operation. While one of the count-up enable signal (UPEN) and the count-down enable signal (DNEN) is asserted, the up-down counter 107 performs a count operation at a clock timing of the write clock signal (WCLK). In the conventional FIFO memory control circuit 1200, when the write clock signal (WCLK) and the read clock signal (RCLK) have the same frequency, the up-down counter 107' uses the write permission signal (WE) as a count-up enable signal (UPEN) which permits a count-up operation and the read permission signal (RE) as a count-down enable signal (DNEN) which permits a count-down operation. While one of the count-up enable signal (UPEN) and the count-down enable signal (DNEN) is asserted, the up-down counter 107' performs a count operation at a clock timing of the read clock signal (RCLK).

In these conventional FIFO memory control circuits 1100 and 1200, when the write clock signal (WCLK) and the read clock signal (RCLK) have different frequencies, a count operation cannot be correctly performed.

For example, in the conventional FIFO memory control circuit 1100 shown in FIG. 11, the up-down counter 107 performs a count operation at a clock timing of the write clock signal (WCLK). In the case where the write clock signal (WCLK) has a higher frequency than that of the read clock signal (RCLK), as shown in FIG. 13, in one read cycle, the count-down enable signal (DNEN=RE) is asserted for a period longer than one cycle of the write clock signal (WCLK). In such a case, although only one data is actually read out, the count value of the up-down counter 107 may be decremented by 2 or more.

On the other hand, in the conventional FIFO memory control circuit 1200 shown in FIG. 12, the up-down counter 107' performs a count operation at a clock timing of the read clock signal (RCLK). In the case where the write clock signal (WCLK) has a higher frequency than that of the read clock signal (RCLK), as shown in FIG. 14, although data is actually written in, the count value of the up-down counter 107' may not be incremented.

Alternatively, when the read clock signal (RCLK) has a higher frequency than that of the write clock signal (WCLK), in the conventional FIFO memory control circuit 1100 shown in FIG. 11, although data is actually read out, the count value of the up-down counter 107 may not be decremented; in the conventional FIFO memory control circuit 1200 shown in FIG. 12, although only one data is actually written in, the count value of the up-down counter 107' may be incremented by 2 or more.

SUMMARY OF THE INVENTION

According to one aspect of the present invention, a FIFO memory control circuit includes: a write address circuit for generating a write address which is an operation address; a read address circuit for generating a read address which is another operation address; a memory which receives a write permission signal, a read permission signal, a write clock signal, and a read clock signal and which has a memory capacity of a predetermined number of words, wherein, while the write permission signal is asserted, data is written into an address in the memory designated by the write address in synchronization with the write clock signal, and while the read permission signal is asserted, data is read from an address in the memory designated by the read address in synchronization with the read clock signal; a first count control enable signal generation circuit for generating a first count control enable signal based on a first clock signal and a least significant bit of a said operation address corresponding to a second clock signal, the first clock signal being one of the write clock signal and the read clock signal which has the higher frequency, and the second clock signal being one of the write clock signal and the read clock signal which has the lower frequency; and an up-down counter which has a count value and receives a count-up enable signal, a count-down enable signal, and the first clock signal, wherein while the count-up enable signal is asserted, the count value is incremented in synchronization with the first clock signal, and while the count-down enable signal is asserted, the count value is decremented in synchronization with the first clock signal, wherein the first count control enable signal is one of the count-up enable signal and the count-down enable signal.

In one embodiment of the present invention, the first clock signal is the write clock signal; the first count control enable signal generation circuit is a count-down enable signal generation circuit; and the first count control enable signal is a count-down enable signal.

In another embodiment of the present invention, the count-down enable signal is asserted for one cycle of the write clock signal in response to one reading operation.

In still another embodiment of the present invention, the first clock signal is the read clock signal; the first count control enable signal generation circuit is a count-up enable signal generation circuit; and the first count control enable signal is a count-up enable signal.

In still another embodiment of the present invention, the count-up enable signal is asserted for one cycle of the read clock signal in response to one writing operation.

In still another embodiment of the present invention, the FIFO memory control circuit further includes a second count control enable signal generation circuit for generating a second count control enable signal based on the first clock signal and a least significant bit of the operation address which corresponds to the first clock signal, wherein the second count control enable signal is the other of the count-up enable signal and the count-down enable signal.

In still another embodiment of the present invention, each of the count-up enable signal and the count-down enable signal is asserted for one cycle of the first clock signal in response to one of a writing operation and a reading operation which corresponds to the first clock signal.

In still another embodiment of the present invention, the FIFO memory control circuit further includes a memory capacity monitoring section, wherein: when the count value of the up-down counter is 0, the memory capacity monitoring section generates an EMPTY signal which indicates that the memory has no data to be read, and when the count value of the up-down counter is equal to the predetermined number of words storable in the memory, the memory capacity monitoring section generates a FULL signal which indicates that the memory has no more capacity to store data.

In still another embodiment of the present invention, the FIFO memory control circuit includes: a write control section for controlling writing of data into the memory based on the FULL signal; and a read control section for controlling reading of data from the memory based on the EMPTY signal.

Hereinafter, functions of the present invention will be described.

According to the present invention, a first count control enable signal is generated based on a first clock signal and a least significant bit of the operation address corresponding to a second clock signal. The first clock signal is one of the write clock signal (WCLK) and the read clock signal (RCLK) having the higher frequency. The second clock signal is one of the write clock signal (WCLK) and the read clock signal (RCLK) having the lower frequency. With such a structure, the first count control enable signal can be asserted in an up-down counter in synchronization with a timing of the first clock signal in response to one reading operation or one writing operation.

Specifically, according to embodiment 1 of the present invention, in the case where the frequency of the write clock signal (WCLK) is higher than that of the read clock signal (RCLK), a count-down enable signal generation circuit generates a count-down enable signal (DNEN) based on a least significant bit (RADR0) of the read address (RADR) and the write clock signal (WCLK). As a result, the count-down enable signal (DNEN) is asserted in the up-down counter in synchronization with a timing of the write clock signal (WCLK) in response to one reading operation.

While the count-down enable signal (DNEN) is asserted in the up-down counter, the up-down counter performs a count-down operation (decrementation) in synchronization with the write clock signal (WCLK). Thus, the up-down counter can decrement the count value (CNT) once in response to one reading operation. While the write permission signal (WE) is asserted in the up-down counter, the up-down counter performs a count-up operation (incrementation) using the write permission signal (WE) as a count-up enable signal (UPEN) in synchronization with the write clock signal (WCLK). Thus, the count value (CNT) can be incremented once in response to one writing operation.

The count-down enable signal (DNEN) only needs to be asserted for one cycle of the write clock signal (WCLK).

Specifically, according to embodiment 2 of the present invention, in the case where the frequency of the read clock signal (RCLK) is higher than that of the write clock signal (WCLK), a count-up enable signal generation circuit generates a count-up enable signal (UPEN) based on a least significant bit (WADR0) of the write address (WADR) and the read clock signal (RCLK). As a result, the count-up enable signal (UPEN) is asserted in the up-down counter in synchronization with a timing of the read clock signal (RCLK) in response to one writing operation.

While the count-up enable signal (UPEN) is asserted in the up-down counter, the up-down counter performs a count-up operation (incrementation) in synchronization with the read clock signal (RCLK). Thus, the up-down counter can increment the count value (CNT) once in response to one writing operation. While the read permission signal (RE) is asserted in the up-down counter, the up-down counter performs a count-down operation (decrementation) using the read permission signal (RE) as a count-down enable signal (DNEN) in synchronization with the read clock signal (RCLK). Thus, the count value (CNT) can be decremented once in response to one reading operation.

The count-up enable signal (UPEN) only needs to be asserted for one cycle of the read clock signal (RCLK).

Specifically, according to embodiment 3 of the present invention, a count-down enable signal generation circuit generates a count-down enable signal (DNEN) based on a least significant bit (RADR0) of the read address (RADR) and one of a write clock signal (WCLK) and a read clock signal (RCLK) having the higher frequency. As a result, the count-down enable signal (DNEN) is asserted in the up-down counter in response to one reading operation in synchronization with a timing of one of the write clock signal (WCLK) and the read clock signal (RCLK) having the higher frequency. On the other hand, a count-up enable signal generation circuit generates a count-up enable signal (UPEN) based on a least significant bit (WADR0) of the write address (WADR) and one of the write clock signal (WCLK) and the read clock signal (RCLK) having the higher frequency. As a result, the count-up enable signal (UPEN) is asserted in the up-down counter in response to one writing operation in synchronization with a timing of one of the write clock signal (WCLK) and the read clock signal (RCLK) having the higher frequency. While the count-down enable signal (DNEN) is asserted in the up-down counter, the up-down counter performs a count-down operation (decrementation) in synchronization with one of the write clock signal (WCLK) and the read clock signal (RCLK) having the higher frequency. Thus, the up-down counter can decrement the count value (CNT) once in response to one reading operation. While the count-up enable signal (UPEN) is asserted in the up-down counter, the up-down counter performs a count-up operation (incrementation) in synchronization with one of the write clock signal (WCLK) and the read clock signal (RCLK) having the higher frequency. Thus, the up-down counter can increment the count value (CNT) once in response to one writing operation.

Each of the count-down enable signal (DNEN) and the count-up enable signal (UPEN) only needs to be asserted for one cycle of one of a write clock signal (WCLK) and a read clock signal (RCLK) having the higher frequency.

When the count value (CNT) of the up-down counter is 0, a memory capacity monitoring section generates an empty signal (EMP), and a read control section controls reading of data from the memory based on the empty signal (EMP). On the other hand, when the count value (CNT) of the up-down counter is equal to the predetermined number of words storable in the memory, the memory capacity monitoring section generates a FULL signal (FLL), and a write control section controls writing of data into the memory based on the FULL signal (FLL).

According to the present invention, the up-down counter can correctly count the amount of effective data in the memory. Thus, data in the memory can be prevented from being lost by being overwritten, and data in the memory can be prevented from being read out twice.

Thus, the invention described herein makes possible the advantage of providing a FIFO memory control circuit in which the amount of effective data in a memory can be correctly counted so that when the frequencies of a read clock and a write clock are different, data is prevented from being lost by being overwritten, and data is prevented from being read out twice.

This and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.

(Embodiment 1)

Figure 1:
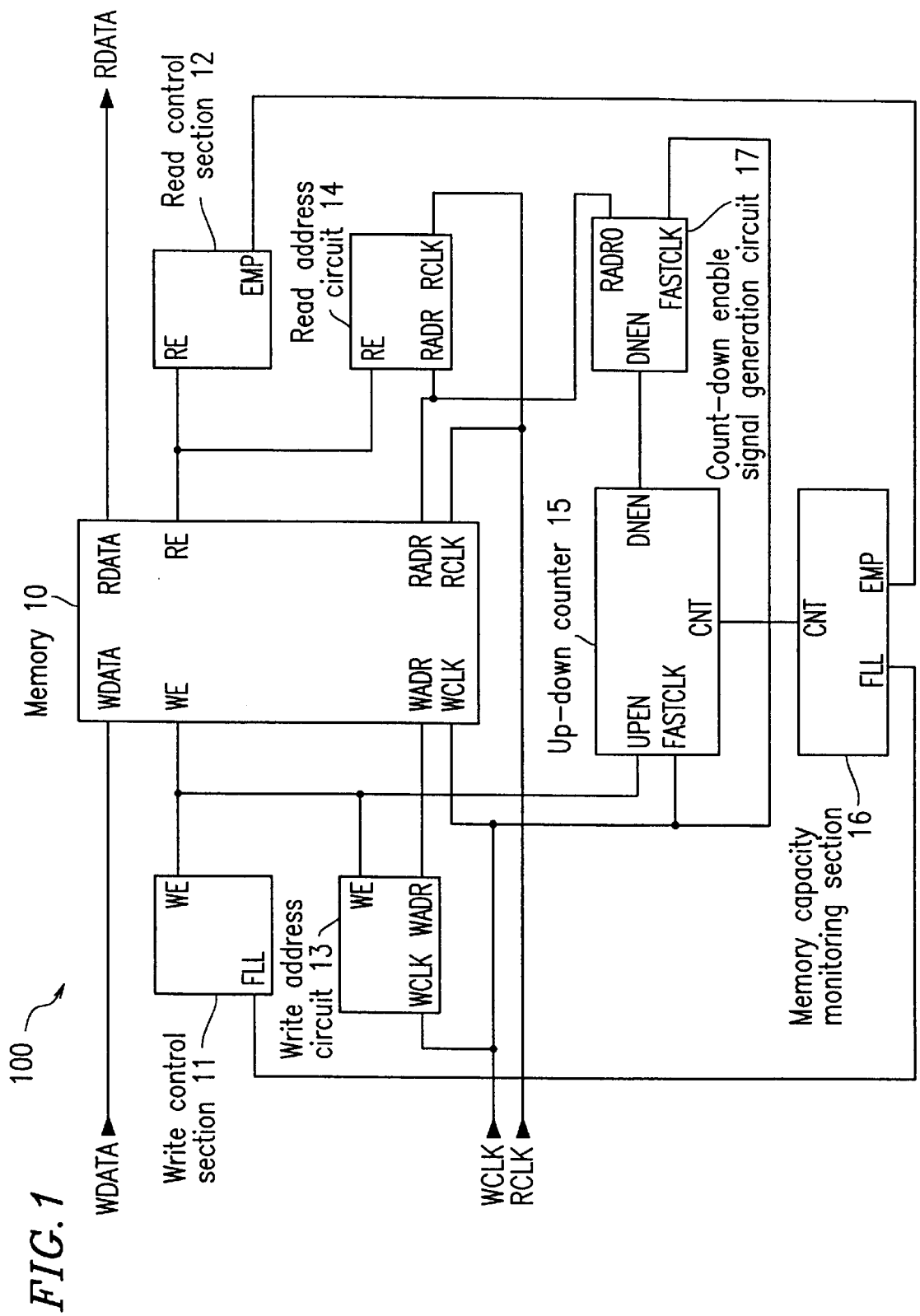
FIG. 1 is a block diagram showing a structure of a FIFO memory control circuit according to embodiment 1 of the present invention.

FIG. 1 is a block diagram showing a structure of a FIFO memory control circuit 100.

The FIFO memory control circuit 100 includes a memory 10, a write control section 11, a read control section 12, a write address circuit 13, a read address circuit 14, and an up-down counter 15, a memory capacity monitoring section 16, and a count-down enable signal generation circuit 17.

Figure 11:
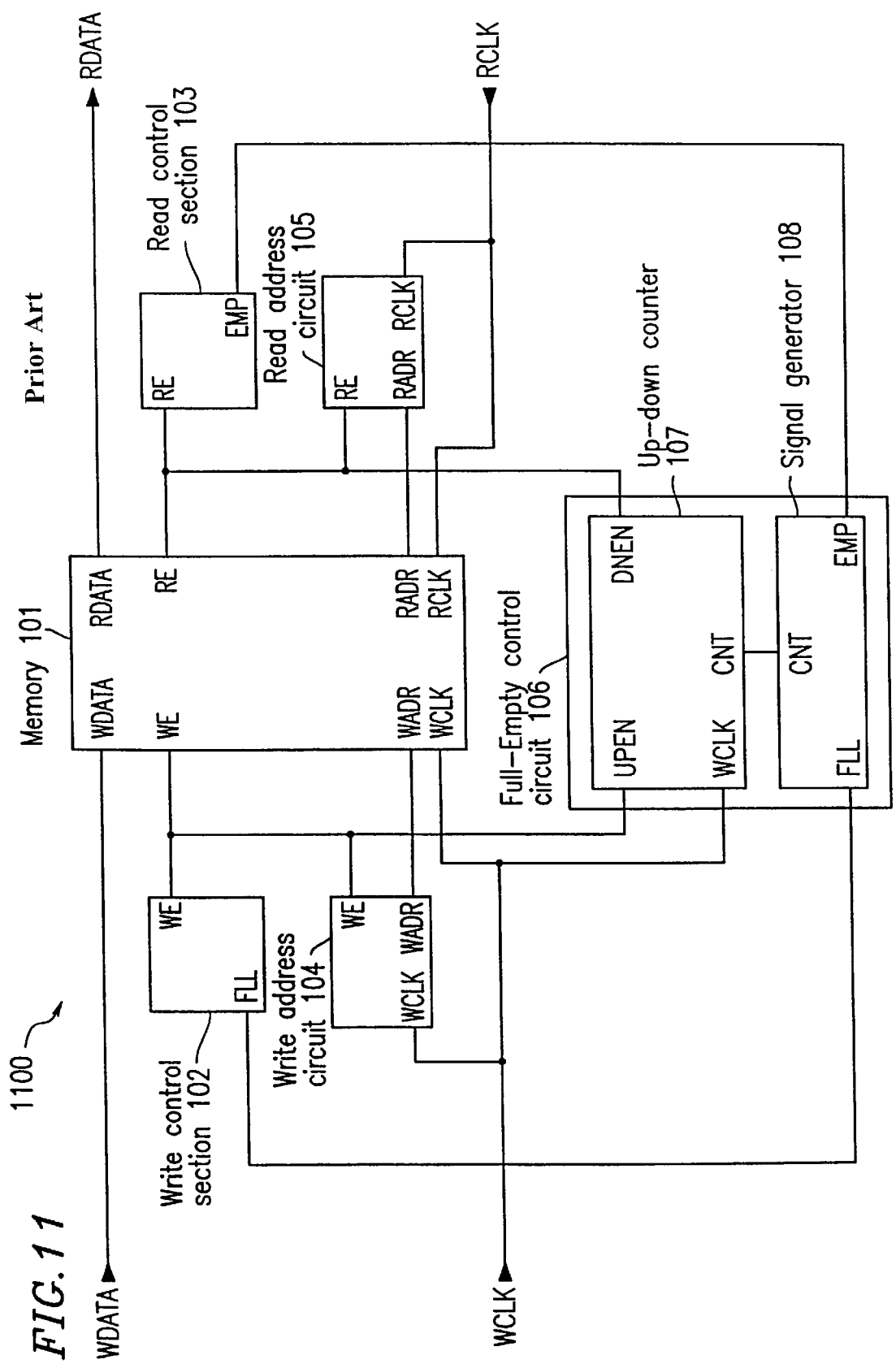
FIG. 11 is a block diagram showing a structure of a conventional FIFO memory control circuit.
Figure 12:
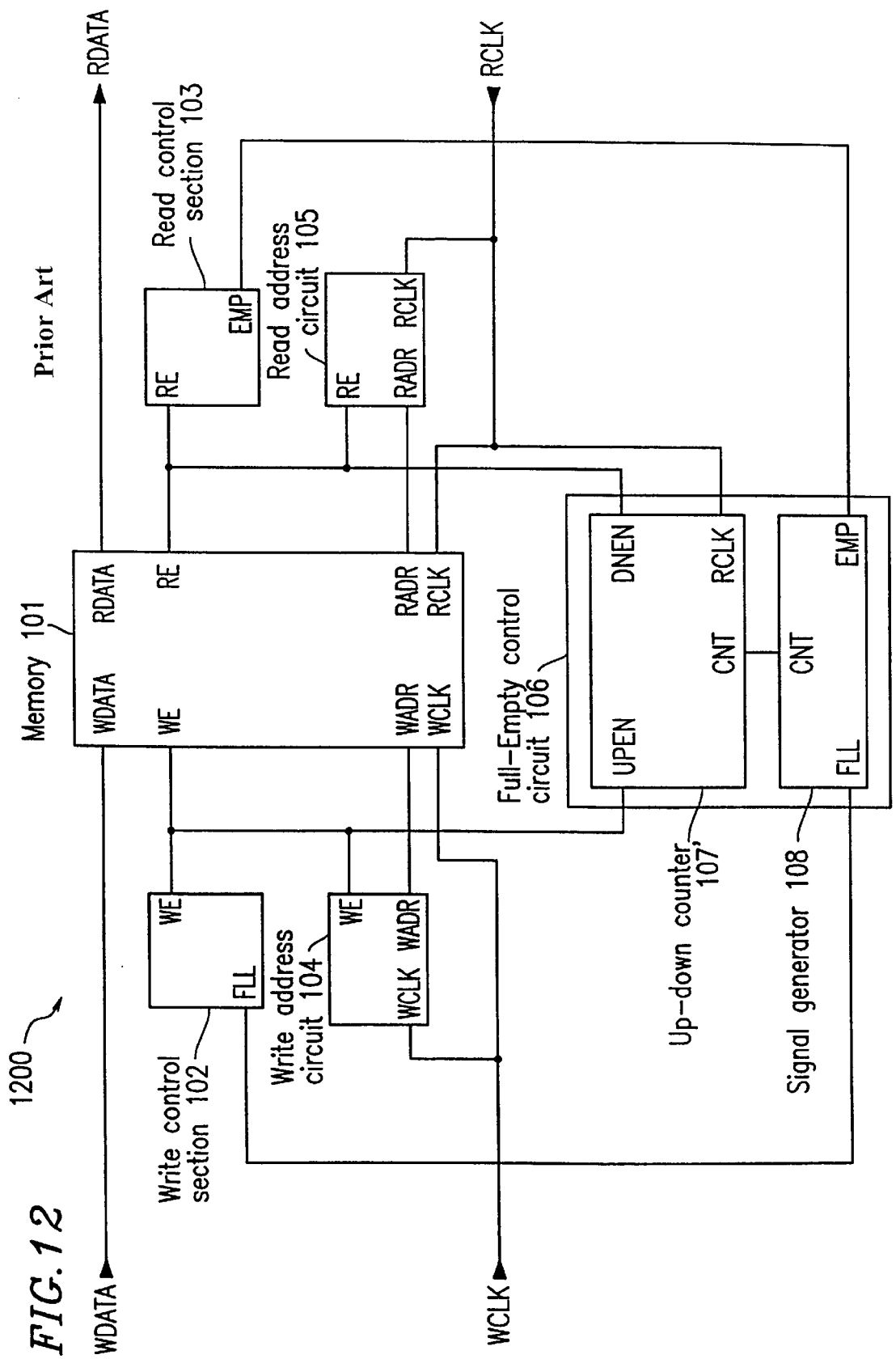
FIG. 12 is a block diagram showing a structure of a conventional FIFO memory control circuit.
Figure 13:
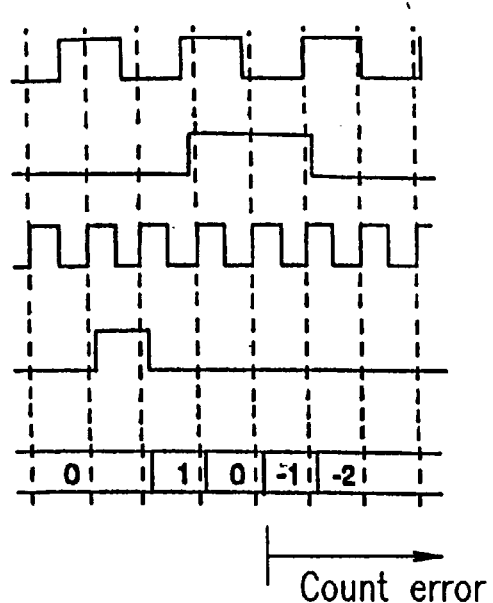
FIG. 13 is a timing chart showing signals in the conventional FIFO memory control circuit of FIG. 11.

The memory 10, the write control section 11, the read control section 12, the write address circuit 13, and the read address circuit 14 respectively have the same structures as those of the memory 101, the write control section 102, the read control section 103, the write address circuit 104, and the read address circuit 105 in the conventional FIFO memory control circuit 1100 shown in FIG. 11, and therefore, further descriptions thereof are omitted. In embodiment 1, the memory 10 has a memory capacity of 5 words, and a write clock signal (WCLK) has a higher frequency than that of a read clock signal (RCLK).

The memory 10 is a dual-port RAM (Random Access Memory) in which reading and writing of data can be performed simultaneously, and which has a memory capacity of N words. In memory 10, while a write permission signal (WE) from the write control section 11 is asserted, data (WDATA) is written in an address designated by a write address (WADR) on the word-by-word basis at a clock timing of a write clock signal (WCLK). On the other hand, while a read permission signal (RE) is asserted, data (RDATA) is read from an address designated by a read address (RADR) on the word-by-word basis at a clock timing of a read clock signal (RCLK).

The write address circuit 13 receives the write clock signal (WCLK) and the write permission signal (WE). While the write permission signal (WE) is asserted, the write address circuit 13 increments the write address (WADR) by one at a clock timing of the write clock signal (WCLK).

The read address circuit 14 receives the read clock signal (RCLK) and the read permission signal (RE). While the read permission signal (RE) is asserted, the read address circuit 14 increments the read address (RADR) by one at a clock timing of the read clock signal (RCLK).

The up-down counter 15 receives the write permission signal (WE) from the write control section 11 as a count-up enable signal (UPEN) which permits a count-up operation and a count-down enable signal (DNEN) which permits a count-down operation from the count-down enable signal generation circuit 17. The up-down counter 15 further receives the write clock signal (WCLK) which has a frequency higher than that of the read clock signal (RCLK). The write clock signal (WCLK) is used as a count clock signal (FASTCLK). While the count-up enable signal (UPEN) is asserted, the count value of the up-down counter 15 is incremented by 1 at a clock timing of the write clock signal (WCLK) in response to one writing operation. While the count-down enable signal (DNEN) is asserted, the count value of the up-down counter 15 is decremented by 1 at a clock timing of the write clock signal (WCLK) in response to one reading operation. The count value (CNT) of the up-down counter 15, which indicates the number of effective data words, is output to the memory capacity monitoring section 16.

Figure 2:
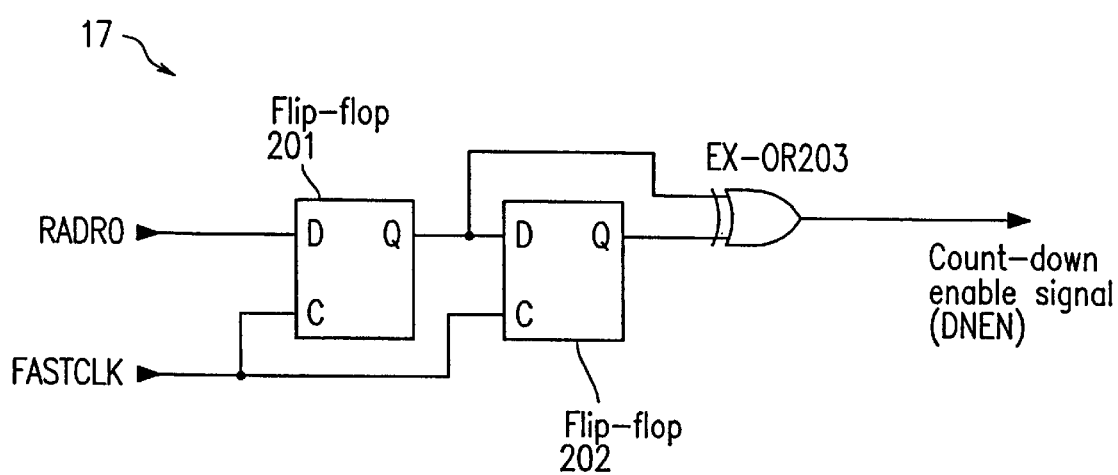
FIG. 2 shows an example of a count-down enable signal generation circuit in the FIFO memory control circuit according to embodiment 1.
Figure 3:
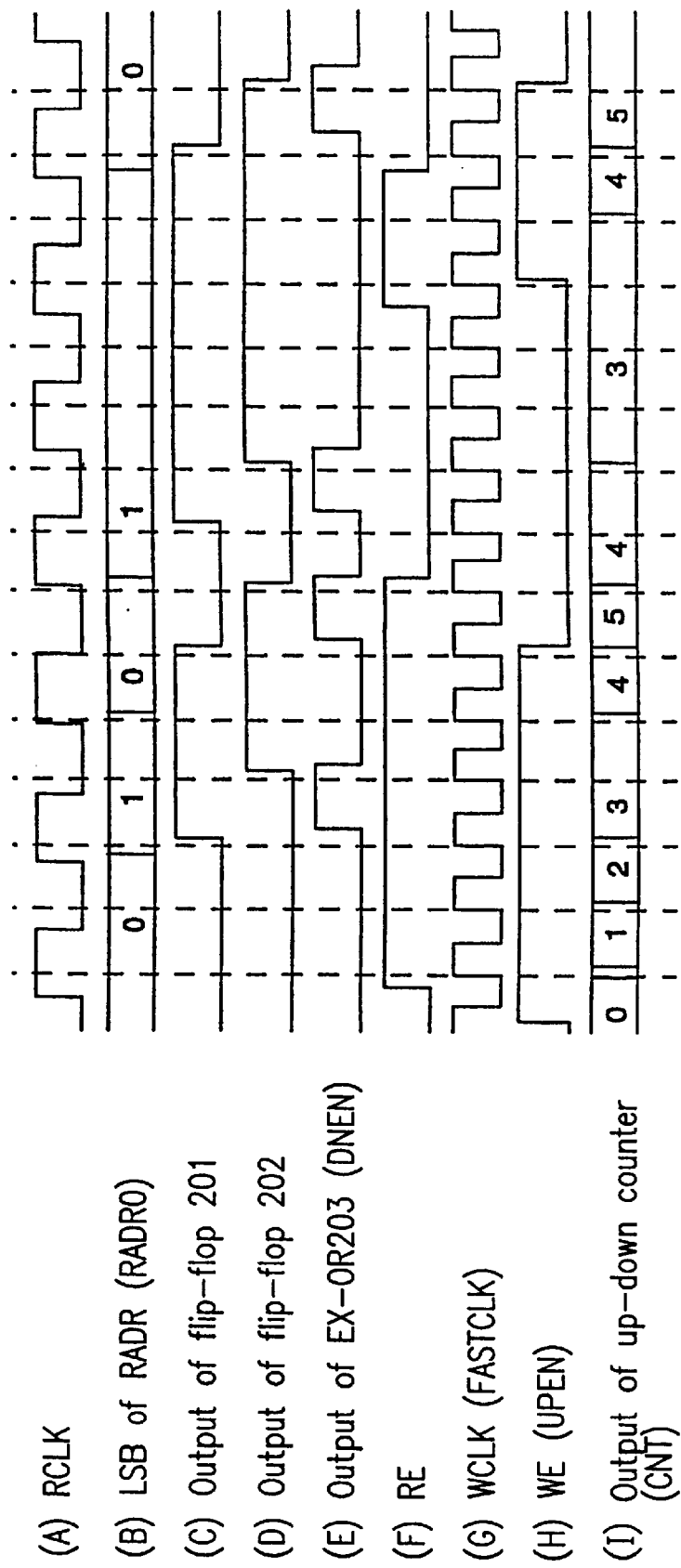
FIG. 3 is a timing chart showing signals in the FIFO memory control circuit according to embodiment 1.

Now, a count operation performed by the up-down counter 15 is described in detail with reference to FIGS. 2 and 3. FIG. 2 shows an example of the count-down enable signal generation circuit 17. FIG. 3 is a timing chart showing signals in the FIFO memory control circuit 100: (A) the read clock signal RCLK; (B) the least significant bit of the read address (RADR0); (C) an output of a flip-flop 201; (D) an output of a flip-flop 202; (E) an output of EX-OR 203 (=count-down enable signal DNEN); (F) the read permission signal RE; (G) the write clock signal WCLK (=count clock signal FASTCLK); (H) the write permission signal WE (=count-up enable signal UPEN); and (I) an output of the up-down counter 15.

In the read address circuit 14, while the read permission signal RE (segment (F) of FIG. 3) is asserted, the read address RADR is output to the count-down enable signal generation circuit 17 at a clock timing of the read clock signal RCLK (segment (A)). Every time the read address RADR varies, the value of the least significant bit of the read address (RADR0) alternately changes between 0 and 1 as shown in segment (B) of FIG. 3. It should be noted that in the present specification, the "write address" and the "read address" are generically referred to as "operation addresses".

Furthermore, in a writing operation, a clock signal, a permission signal, an address signal, and the LSB value of the address signal correspond to a write clock signal WCLK, a write permission signal WE, a write address signal WADR, and the LSB value of the write address signal (WADR0), respectively. In a reading operation, a clock signal, a permission signal, an address signal, and the LSB value of the address signal correspond to a read clock signal RCLK, a read permission signal RE, a read address signal RADR, and the LSB value of the read address signal (RADR0), respectively.

The count-down enable signal generation circuit 17 shown in FIG. 2 is formed by two flip-flops 201 and 202 and an EX-OR 203. The flip-flop 201 receives the value of LSB of the read address (RADR0) shown in segment (B) of FIG. 3 at the timing of the write clock signal WCLK (=count clock signal FASTCLK) shown in segment (G), and then outputs a signal as shown in segment (C). The flip-flop 202 receives the output of the flip-flop 201 (segment (C)) at the timing of the write clock signal WCLK (=FASTCLK) shown in segment (G), and then outputs a signal as shown in segment (D). The EX-OR 203 receives the output signal of the flip-flop 201 (segment (C)) and the output signal of the flip-flop 202 (segment (D)), and then outputs the exclusive-OR of these signals as a count-down enable signal DNEN (segment (E)). This count-down enable signal DNEN is synchronized with the write clock signal WCLK, and is asserted in the up-down counter 15 for one cycle of the write clock signal WCLK in response to one reading operation. Accordingly, the up-down counter 15 decrements the count value (CNT) once in response to one reading operation. As a result, count operations (incrementation/decrementation) of the up-down counter 15 based on the same clock signal (in embodiment 1, the write clock signal WCLK) can be accurately carried out without causing an error in conjunction with reading and writing operations in the memory 10.

The count-down enable signal DNEN (segment (E)) rises in response to a rising edge of the write clock signal WCLK (segment (G)). In embodiment 1, rising edges of the count-down enable signal DNEN (segment (E)) are delayed with respect to rising edges of the write clock signal WCLK (segment (G)) as shown in FIG. 3. That is, a time delay is provided from the rising edge of the write clock signal WCLK until the count-down enable signal DNEN (segment (E)) is asserted. Such a time delay assures that the up-down counter 15 performs a count operation at a next rising edge of the write clock signal WCLK (segment (G)). If the count-down enable signal DNEN (segment (E)) and the write clock signal WCLK (segment (G)) were to change at the same time, it may be uncertain in response to which rising edge of the write clock signal WCLK (segment (G)) the up-down counter 15 would perform a count operation. This will be also considered in embodiments 2 and 3.

The memory capacity monitoring section 16 receives the count value (CNT) from the up-down counter 15. When the count value (CNT) is 0, the memory capacity monitoring section 16 outputs to the read control section 12 an empty signal EMP which indicates that the memory 10 has no data to be read. When the count value (CNT) is equal to the number of words storable in the memory 10 (in embodiment 1, "5"), the memory capacity monitoring section 16 outputs to the write control section 11 a full signal FLL which indicates that the memory 10 has no more capacity to store data.

With the above structure, the amount of effective data (i.e., the number of effective data words) in the memory 10 can be correctly counted. Thus, when the full signal FLL is asserted in the write control section 11, the write control section 11 prohibits writing data in the memory 10, thereby preventing data from being lost by being overwritten. Furthermore, when the empty signal EMP is asserted in the read control section 12, the read control section 12 prohibits reading data from the memory 10, thereby preventing data from being read out twice.

(Embodiment 2)

Figure 4:
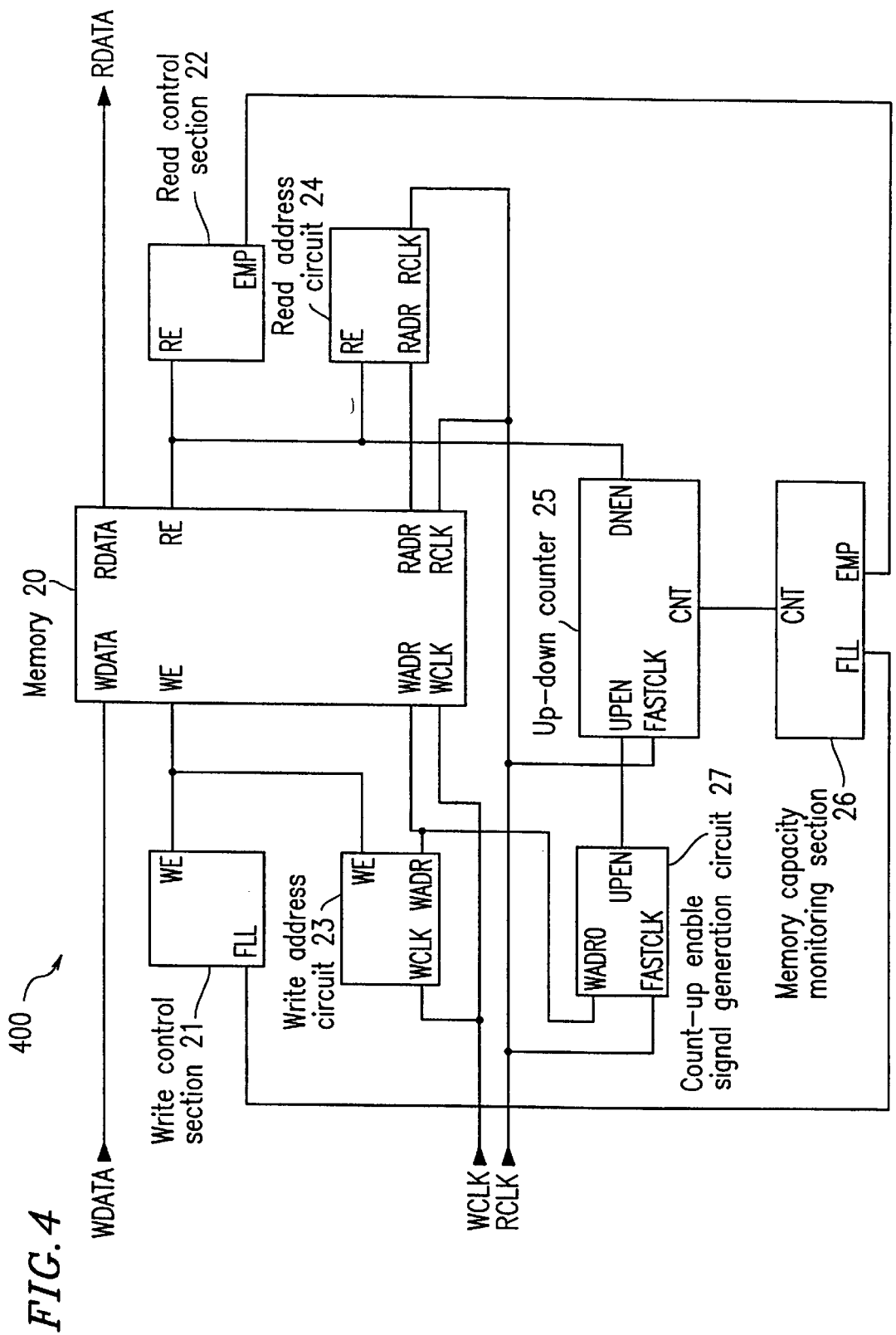
FIG. 4 is a block diagram showing a structure of a FIFO memory control circuit according to embodiment 2 of the present invention.

FIG. 4 is a block diagram showing a structure of a FIFO memory control circuit 400.

The FIFO memory control circuit 400 includes a memory 20, a write control section 21, a read control section 22, a write address circuit 23, a read address circuit 24, and an up-down counter 25, a memory capacity monitoring section 26, and a count-up enable signal generation circuit 27.

The memory 20, the write control section 21, the read control section 22, the write address circuit 23, and the read address circuit 24 respectively have the same structures as those of the memory 101, the write control section 102, the read control section 103, the write address circuit 104, and the read address circuit 105 in the conventional FIFO memory control circuit 1100 shown in FIG. 11, and therefore, further descriptions thereof are omitted. In embodiment 2, the memory 20 has a memory capacity of 5 words, and a read clock signal (RCLK) has a higher frequency than that of a write clock signal (WCLK).

The up-down counter 25 receives the read permission signal (RE) from the read control section 22 as a count-down enable signal (DNEN) which permits a count-down operation and a count-up enable signal (UPEN) which permits a count-up operation from the count-up enable signal generation circuit 27. The up-down counter 25 further receives the read clock signal (RCLK) which has a frequency higher than that of the write clock signal (WCLK). The read clock signal (RCLK) is used as a count clock signal (FASTCLK). While the count-up enable signal (UPEN) is asserted, the count value of the up-down counter 25 is incremented by 1 at a clock timing of the read clock signal (RCLK) in response to one writing operation. While the count-down enable signal (DNEN) is asserted, the count value of the up-down counter 25 is decremented by 1 at a clock timing of the write clock signal (WCLK) in response to one reading operation. The count value (CNT) of the up-down counter 25, which indicates the number of effective data words, is output to the memory capacity monitoring section 26.

Figure 5:
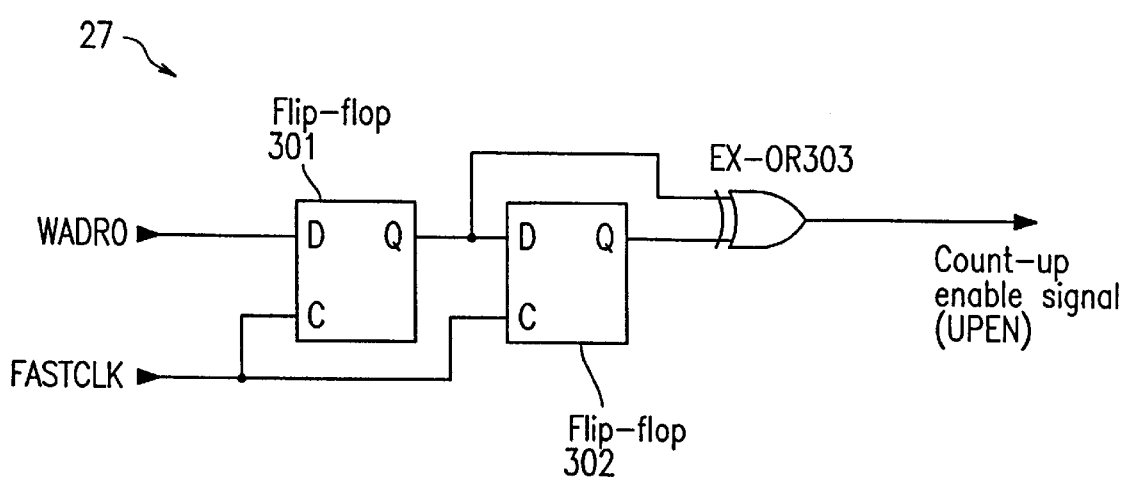
FIG. 5 shows an example of a count-up enable signal generation circuit in the FIFO memory control circuit according to embodiment 2.
Figure 6:
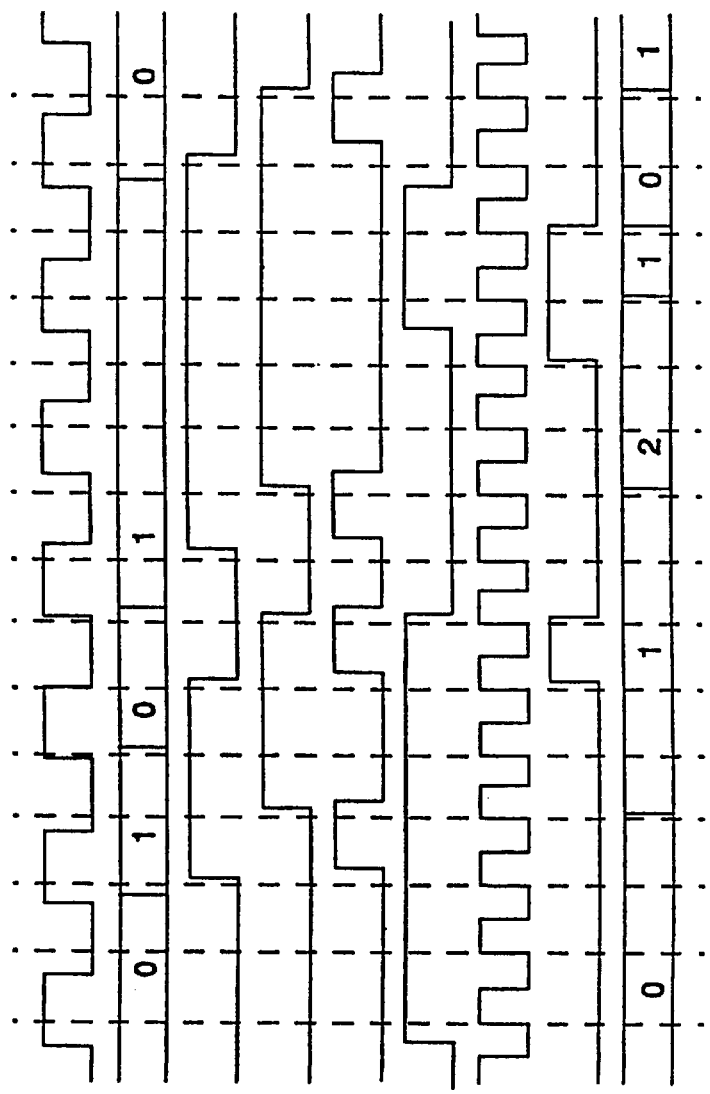
FIG. 6 is a timing chart showing signals in the FIFO memory control circuit according to embodiment 2.

Now, a count operation performed by the up-down counter 25 is described in detail with reference to FIGS. 5 and 6. FIG. 5 shows an example of the count-up enable signal generation circuit 27. FIG. 6 is a timing chart showing signals in the FIFO memory control circuit 400: (A) the write clock signal WCLK; (B) the least significant bit of the write address (WADR0); (C) an output of a flip-flop 301; (D) an output of a flip-flop 302; (E) an output of EX-OR 303 (=count-up enable signal UPEN); (F) the write permission signal WE; (G) the read clock signal RCLK (=count clock signal FASTCLK); (H) the read permission signal RE; and (I) an output of the up-down counter 25 (CNT).

In the write address circuit 23, while the write permission signal WE (segment (F) of FIG. 6) is asserted, the write address WADR is output to the count-up enable signal generation circuit 27 at a clock timing of the write clock signal WCLK (segment (A)). Every time the write address WADR varies, the value of the least significant bit of the write address (WADR0) alternately changes between 0 and 1 as shown in segment (B) of FIG. 6.

The count-up enable signal generation circuit 27 shown in FIG. 5 is formed by two flip-flops 301 and 302 and an EX-OR 303. The flip-flop 301 receives the value of LSB of the write address (WADR0) shown in segment (B) of FIG. 6 at the timing of the read clock signal RCLK (count clock signal FASTCLK) shown in segment (G), and then outputs a signal as shown in segment (C). The flip-flop 302 receives the output of the flip-flop 301 (segment (C)) at the timing of the read clock signal RCLK (=FASTCLK) shown in segment (G), and then outputs a signal as shown in segment (D). The EX-OR 303 receives the output signal of the flip-flop 301 (segment (C)) and the output signal of the flip-flop 302 (segment (D)), and then outputs the exclusive-OR of these signals as a count-up enable signal UPEN (segment (E)). This count-up enable signal UPEN is in synchronization with the read clock signal RCLK, and is asserted in the up-down counter 25 for one cycle of the read clock signal RCLK in response to one writing operation. Accordingly, the up-down counter 25 increments the count value (CNT) once in response to one writing operation. As a result, count operations (incrementation/decrementation) of the up-down counter 15 based on the same clock signal (in embodiment 2, the read clock signal RCLK) can be accurately carried out without causing an error in conjunction with reading and writing operations in the memory 20.

The memory capacity monitoring section 26 receives the count value (CNT) from the up-down counter 25. When the count value (CNT) is 0, the memory capacity monitoring section 26 outputs to the read control section 22 an empty signal EMP which indicates that the memory 20 has no data to be read. When the count value (CNT) is equal to the number of words storable in the memory 20 (in embodiment 2, "5"), the memory capacity monitoring section 26 outputs to the write control section 21 a full signal FLL which indicates that the memory 20 has no more capacity to store data.

With the above structure, the amount of effective data (i.e., the number of effective data words) in the memory 20 can be correctly counted. Thus, when the full signal FLL is asserted in the write control section 21, the write control section 21 prohibits writing data in the memory 20, thereby preventing data from being lost by being overwritten. Furthermore, when the empty signal EMP is asserted in the read control section 22, the read control section 22 prohibits reading data from the memory 20, thereby preventing data from being read out twice.

(Embodiment 3)

Figure 7A:
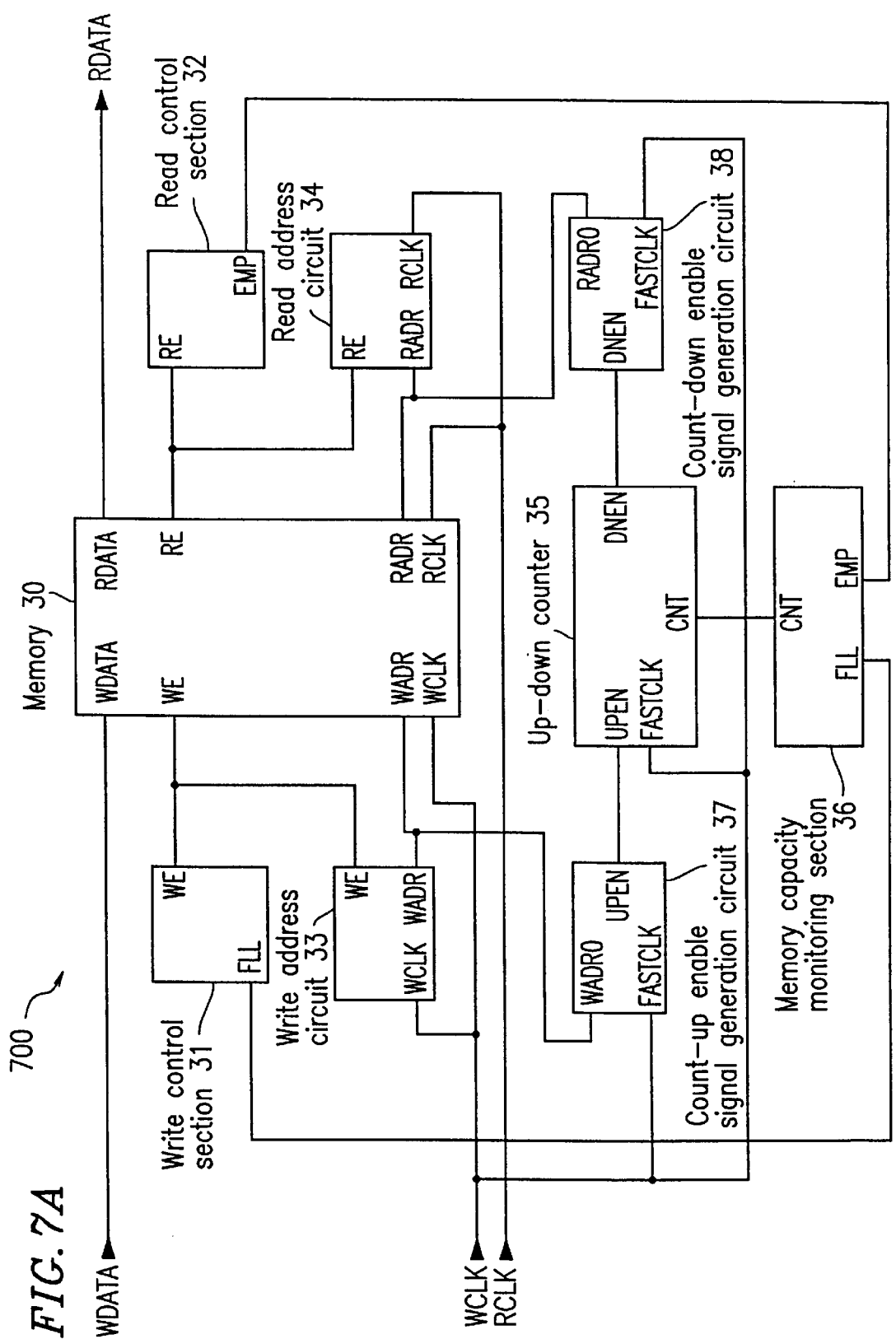
FIG. 7A is a block diagram showing a structure of a FIFO memory control circuit according to embodiment 3 of the present invention.

FIG. 7A is a block diagram showing a structure of a FIFO memory control circuit 700.

The FIFO memory control circuit 700 includes a memory 30, a write control section 31, a read control section 32, a write address circuit 33, a read address circuit 34, and an up-down counter 35, a memory capacity monitoring section 36, a count-up enable signal generation circuit 37, and a count-down enable signal generation circuit 38.

The memory 30, the write control section 31, the read control section 32, the write address circuit 33, and the read address circuit 34 respectively have the same structures as those of the memory 101, the write control section 102, the read control section 103, the write address circuit 104, and the read address circuit 105 in the conventional FIFO memory control circuit 1100 shown in FIG. 11, and therefore, further descriptions thereof are omitted. In embodiment 3, the memory 30 has a memory capacity of 5 words, and a write clock signal (WCLK) has a higher frequency than that of a read clock signal (RCLK).

The up-down counter 35 receives a count-up enable signal (UPEN) which permits a count-up operation from the count-up enable signal generation circuit 37 and a count-down enable signal (DNEN) which permits a count-down operation from the count-down enable signal generation circuit 38. The up-down counter 35 further receives the write clock signal (WCLK) which has a frequency higher than that of the read clock signal (RCLK). Herein, the write clock signal (WCLK) is used as a count clock signal (FASTCLK). While the count-up enable signal (UPEN) is asserted, the count value of the up-down counter 35 is incremented by 1 at a clock timing of the write clock signal (WCLK) in response to one writing operation. While the count-down enable signal (DNEN) is asserted, the count value of the up-down counter 35 is decremented by 1 at a clock timing of the write clock signal (WCLK) in response to one reading operation. The count value (CNT) of the up-down counter 35, which indicates the number of effective data words, is output to the memory capacity monitoring section 36.

Figure 8:
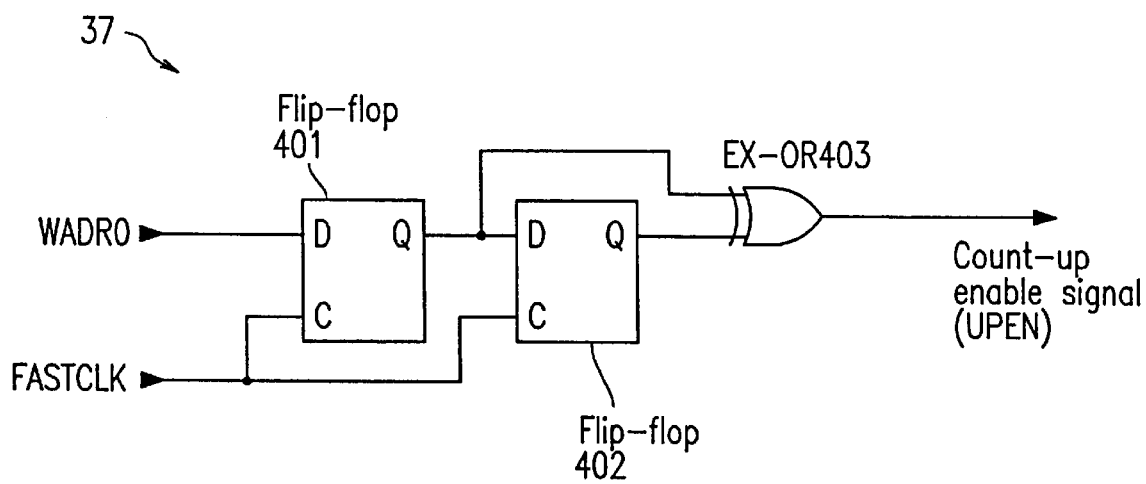
FIG. 8 shows an example of a count-up enable signal generation circuit in the FIFO memory control circuit according to embodiment 3.
Figure 9:
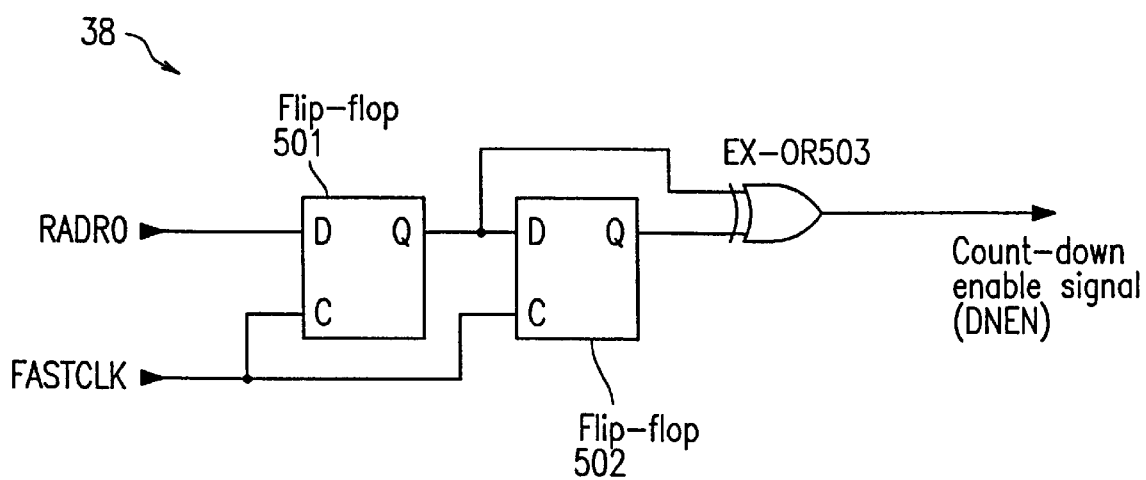
FIG. 9 shows an example of a count-down enable signal generation circuit in the FIFO memory control circuit according to embodiment 3.
Figure 10:
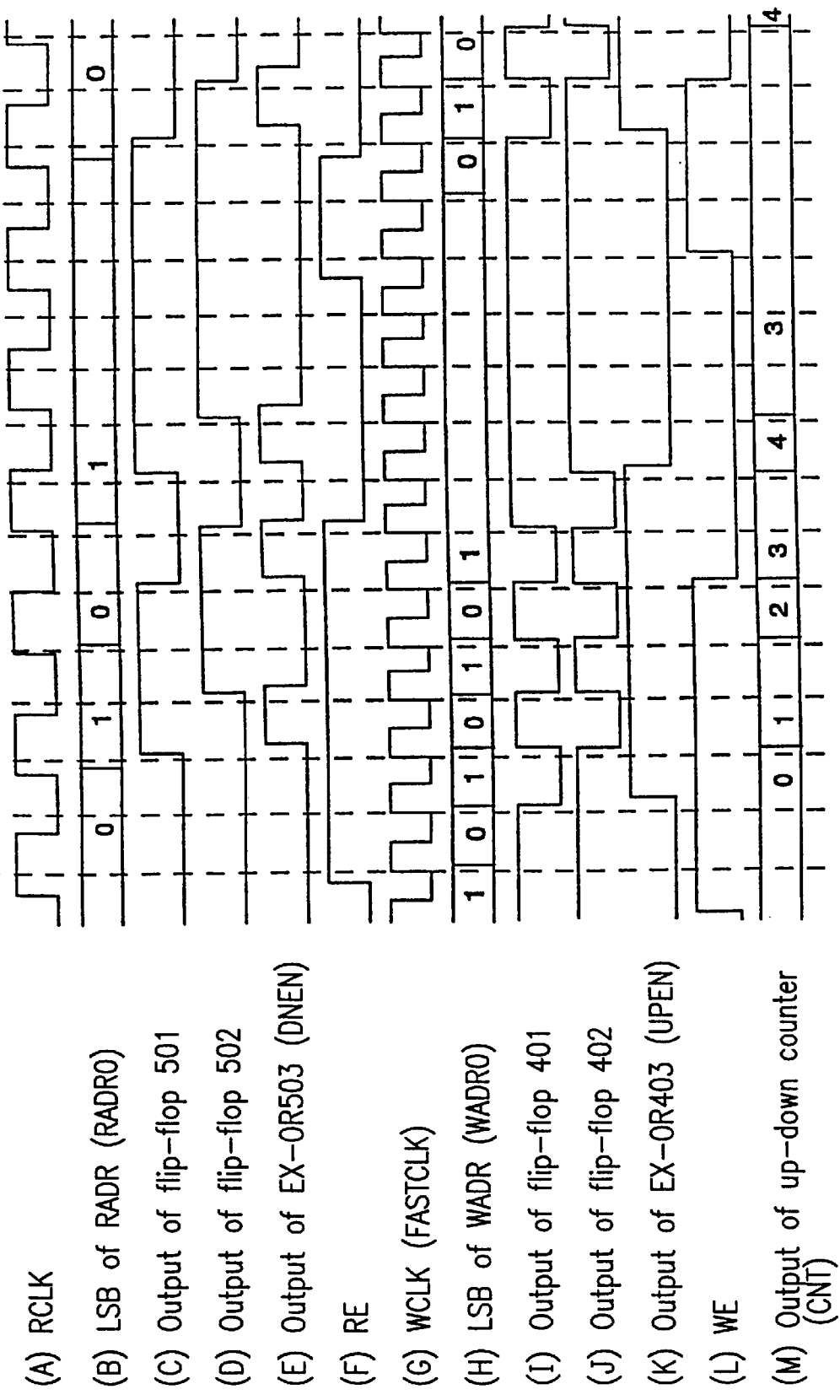
FIG. 10 is a timing chart showing signals in the FIFO memory control circuit according to embodiment 3.

Now, a count operation performed by the up-down counter 35 is described in detail with reference to FIGS. 8, 9, and 10. FIG. 8 shows an example of the count-up enable signal generation circuit 37. FIG. 9 shows an example of the count-down enable signal generation circuit 38. FIG. 10 is a timing chart showing signals in the FIFO memory control circuit 700: (A) the read clock signal RCLK: (B) the least significant bit of the read address (RADR0); (C) an output of a flip-flop 501: (D) an output of a flip-flop 502: (E) an output of EX-OR 503 (=count-down enable signal DNEN); (F) the read permission signal RE: (G) the write clock signal WCLK(=count clock signal FASTCLK); (H) the least significant bit of the write address (WADR0); (I) an output of a flip-flop 401; (J) an output of a flip-flop 402; (K) an output of EX-OR 403 (=count-up enable signal UPEN); (L) the write permission signal WE: and (M) an output of the up-down counter 35.

In the write address circuit 33, while the write permission signal WE (segment (L) of FIG. 10) is asserted, the write address WADR is output to the count-up enable signal generation circuit 37 at a clock timing of the write clock signal RCLK (segment (G)). Every time the write address WADR varies, the value of the least significant bit of the write address (WADR0) alternately changes between 0 and 1 as shown in segment (H) of FIG. 10.

In the read address circuit 34, while the read permission signal RE (segment (F) of FIG. 10) is asserted, the read address RADR is output to the count-down enable signal generation circuit 38 at a clock timing of the read clock signal RCLK (segment (A)). Every time the read address RADR varies, the value of the least significant bit of the read address (RADR0) alternately changes between 0 and 1 as shown in segment (B) of FIG. 10.

The count-up enable signal generation circuit 37 shown in FIG. 8 is formed by two flip-flops 401 and 402 and an EX-OR 403. The flip-flop 401 receives the value of LSB of the write address (WADR0) shown in segment (H) of FIG. 10 at the timing of the write clock signal WCLK (=count clock signal FASTCLK) shown in segment (G), and then outputs a signal as shown in segment (I). The flip-flop 402 receives the output of the flip-flop 401 (segment (I)) at the timing of the read clock signal RCLK (=FASTCLK) shown in segment (G), and then outputs a signal as shown in segment (J). The EX-OR 403 receives the output signal of the flip-flop 401 (segment (I)) and the output signal of the flip-flop 402 (segment (J)), and then outputs the exclusive-OR of these signals as a count-up enable signal UPEN (segment (K)). This count-up enable signal UPEN is in synchronization with the write clock signal WCLK, and is asserted in the up-down counter 35 for one cycle of the write clock signal WCLK in response to one writing operation. Accordingly, the up-down counter 35 increments the count value (CNT) once in response to one writing operation.

The count-down enable signal generation circuit 38 shown in FIG. 9 is formed by two flip-flops 501 and 502 and an EX-OR 503. The flip-flop 501 receives the value of LSB of the read address (RADR0) shown in segment (B) of FIG. 10 at the timing of the write clock signal WCLK (=count clock signal FASTCLK) shown in segment (G), and then outputs a signal as shown in segment (C). The flip-flop 502 receives the output of the flip-flop 501 (segment (C)) at the timing of the write clock signal WCLK (=FASTCLK) shown in segment (G), and then outputs a signal as shown in segment (D). The EX-OR 503 receives the output signal of the flip-flop 501 (segment (C)) and the output signal of the flip-flop 502 (segment (D)), and then outputs the exclusive-OR of these signals as a count-down enable signal DNEN (segment (E)). This count-down enable signal DNEN is synchronized with the write clock signal WCLK, and is asserted in the up-down counter 35 for one cycle of the write clock signal WCLK in response to one reading operation. Accordingly, the up-down counter 35 decrements the count value (CNT) once in response to one reading operation. As a result, count operations (incrementation/decrementation) of the up-down counter 35 based on the same clock signal (in embodiment 3, the write clock signal WCLK) can be accurately carried out without causing an error in conjunction with reading and writing operations in the memory 30.

The memory capacity monitoring section 36 receives the count value (CNT) from the up-down counter 35. When the count value (CNT) is 0, the memory capacity monitoring section 36 outputs to the read control section 32 an empty signal EMP which indicates that the memory 30 has no data to be read. When the count value (CNT) is equal to the number of words storable in the memory 30 (in embodiment 3, "5"), the memory capacity monitoring section 36 outputs to the write control section 31 a full signal FLL which indicates that the memory 30 has no more capacity to store data.

With the above structure, the amount of effective data (i.e., the number of effective data words) in the memory 30 can be correctly counted. Thus, when the full signal FLL is asserted in the write control section 31, the write control section 31 prohibits writing data in the memory 30, thereby preventing data from being lost by being overwritten. Furthermore, when the empty signal EMP is asserted in the read control section 32, the read control section 32 prohibits reading data from the memory 30, thereby preventing data from being read out twice.

In embodiments 1–3, the memories 10, 20, and 30 each have a memory capacity of 5 words. However, the present invention is not limited to such a memory capacity but applicable to any memory capacity. Moreover, in embodiment 3, the write clock signal (WCLK) has a higher frequency than that of the read clock signal (RCLK). However, even in the case where the read clock signal (RCLK) has a higher frequency than that of the write clock signal (WCLK), the present invention can be carried out by using the read clock signal (RCLK) as a count clock signal (FASTCLK) in the up-down counter 35. That is, according to the present invention, one of the write clock signal (WCLK) and the read clock signal (RCLK) which has the higher frequency is used as the count clock signal (FASTCLK).

Figure 7B:
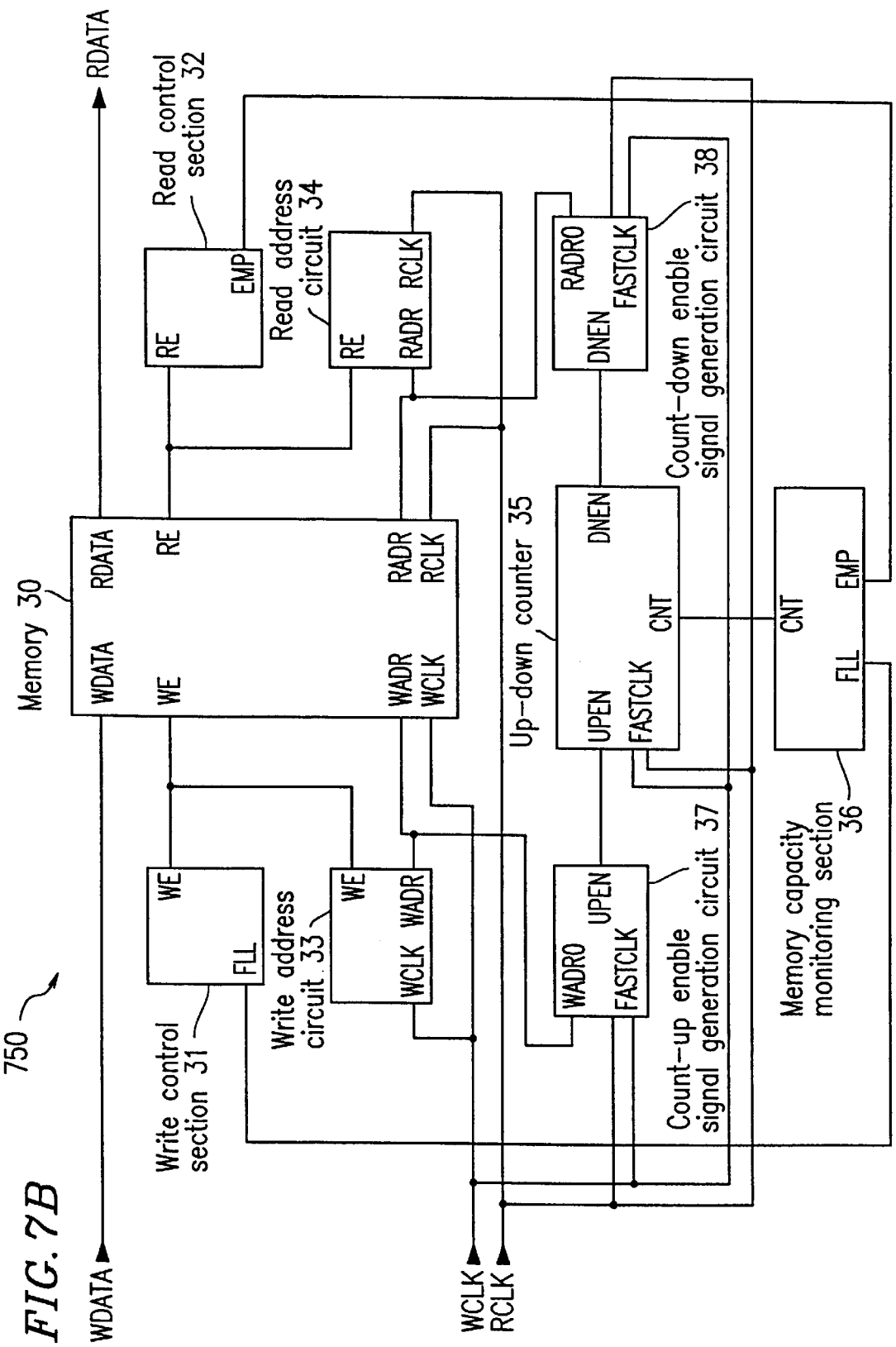
FIG. 7B is a block diagram showing a structure of another FIFO memory control circuit according to embodiment 3 of the present invention.

According to embodiment 3, as shown in a FIFO memory control circuit 750 of FIG. 7B, both a signal line for the write clock signal (WCLK) and a signal line for the read clock signal (RCLK) may be connected to a terminal FASTCLK of each of the up-down counter 35, the count-up enable signal generation circuit 37, and the count-down enable signal generation circuit 38. After the frequencies of the write clock signal (WCLK) and the read clock signal (RCLK) are measured by any method, one of these clock signals which has the higher frequency is supplied as a count clock signal (FASTCLK) to each of the up-down counter 35, the count-up enable signal generation circuit 37, and the count-down enable signal generation circuit 38. In such a structure, even when a read clock signal (RCLK) and a write clock signal (WCLK) each have any frequency, count operations of the up-down counter 35 can be accurately carried out without causing an error in conjunction with reading and writing operations in the memory 30.

As described hereinabove, in a FIFO memory control circuit according to the present invention, in the case where the frequencies of a read clock signal and a write clock signal are different, a permission signal which permits a count operation of an up-down counter is synchronized with one of the write clock signal and the read clock signal which has the higher frequency, and the permission signal is asserted for a time period which is equal to one cycle of the clock signal which has the higher frequency, whereby the amount of effective data in the memory can be correctly counted. As a result, data in the memory is prevented from being lost by being overwritten, and data in the memory is prevented from being read out twice.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A FIFO memory control circuit, comprising:
    a write address circuit for generating a write address which is an operation address;
    a read address circuit for generating a read address which is another operation address;
    a memory which receives a write permission signal, a read permission signal, a write clock signal, and a read clock signal and which has a memory capacity of a predetermined number of words, wherein,
        while the write permission signal is asserted, data is written into an address in the memory designated by the write address in synchronization with the write clock signal, and
        while the read permission signal is asserted, data is read from an address in the memory designated by the read address in synchronization with the read clock signal;
    a first count control enable signal generation circuit for generating a first count control enable signal based on a first clock signal and a least significant bit of a said operation address corresponding to a second clock signal, the first clock signal being one of the write clock signal and the read clock signal which has the higher frequency, and the second clock signal being one of the write clock signal and the read clock signal which has the lower frequency; and
    an up-down counter which has a count value and receives a count-up enable signal, a count-down enable signal, and the first clock signal, wherein
        while the count-up enable signal is asserted, the count value is incremented in synchronization with the first clock signal, and
        while the count-down enable signal is asserted, the count value is decremented in synchronization with the first clock signal,
    wherein the first count control enable signal is one of the count-up enable signal and the count-down enable signal.

2. A FIFO memory control circuit according to claim 1, wherein:
    the first clock signal is the write clock signal;
    the first count control enable signal generation circuit is a count-down enable signal generation circuit; and
    the first count control enable signal is a count-down enable signal.

3. A FIFO memory control circuit according to claim 2, wherein the count-down enable signal is asserted for one cycle of the write clock signal in response to one reading operation.

4. A FIFO memory control circuit according to claim 1, wherein:
    the first clock signal is the read clock signal;
    the first count control enable signal generation circuit is a count-up enable signal generation circuit; and
    the first count control enable signal is a count-up enable signal.

5. A FIFO memory control circuit according to claim 4, wherein the count-up enable signal is asserted for one cycle of the read clock signal in response to one writing operation.

6. A FIFO memory control circuit according to claim 1, further comprising a second count control enable signal generation circuit for generating a second count control enable signal based on the first clock signal and a least significant bit of the operation address which corresponds to the first clock signal,
    wherein the second count control enable signal is the other of the count-up enable signal and the count-down enable signal.

7. A FIFO memory control circuit according to claim 6, wherein each of the count-up enable signal and the count-down enable signal is asserted for one cycle of the first clock signal in response to one of a writing operation and a reading operation which corresponds to the first clock signal.

8. A FIFO memory control circuit according to claim 1, further comprising a memory capacity monitoring section, wherein:
    when the count value of the up-down counter is 0, the memory capacity monitoring section generates an EMPTY signal which indicates that the memory has no data to be read, and
    when the count value of the up-down counter is equal to the predetermined number of words storable in the memory, the memory capacity monitoring section generates a FULL signal which indicates that the memory has no more capacity to store data.

9. A FIFO memory control circuit according to claim 8, comprising:
    a write control section for controlling writing of data into the memory based on the FULL signal; and
    a read control section for controlling reading of data from the memory based on the EMPTY signal.

* * * * *

UNITED STATES PATENT AND TRADEMARK OFFICE
CERTIFICATE OF CORRECTION

Figure 14:
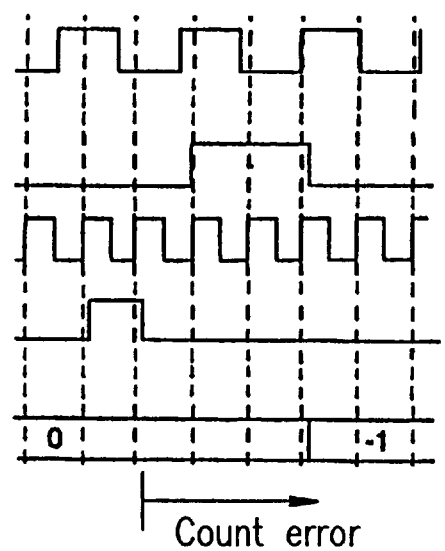
FIG. 14 is a timing chart showing signals in the conventional FIFO memory control circuit of FIG. 12.

PATENT NO. : 6,470,439 B2
DATED : October 22, 2002
INVENTOR(S) : Takashi Yamada and Koji Horikawa It is certified that error appears in the above-identified patent and that said Letters Patent is hereby corrected as shown below:

Title page,
Item [56], FOREIGN PATENT DOCUMENTS, please add
-- JP    60-117487    6-1985 *cited by examiner --;
Item [57], ABSTRACT,
Line 5, please replace the word "hen" with -- when --;

Drawings,
Figure 14, please replace "Read clock siganl" with -- Read clock signal --;

Column 10,
Line 16, please replace the words "RCLK (count" with -- RCLK (=count --;

Column 11,
Line 36, please replace "WCLK(=count" with -- WCLK (=count --;
Line 39, please replace "WE:" with -- WE; --;

Signed and Sealed this

Fifteenth Day of April, 2003

JAMES E. ROGAN
*Director of the United States Patent and Trademark Office*